United States Patent Office 2,932,622
Patented Apr. 12, 1960

2,932,622

VULCANIZABLE COMPOSITION CONTAINING SULFUR, RUBBER, AND AN ALKENYLTHIOPHENOL

Herman S. Bloch, Chicago, Ill., assignor, by mesne assignments, to Universal Oil Products Company, Des Plaines, Ill., a corporation of Delaware No Drawing. Application December 11, 1953
Serial No. 397,764

7 Claims. (Cl. 260—4)

This application is a continuation-in-part of my copending application Serial No. 240,034, filed August 2, 1951, now U.S. Patent No. 2,662,869, which is itself a continuation-in-part of my copending application Serial No. 673,482, filed May 31, 1946, now abandoned.

This invention relates to a bonding composition suitable for joining metal, wood, glass, and a thermosetting resin to each other or for joining pieces of one of these materials.

An object of this invention is to form a vulcanizable bonding composition by interacting unsaturated compounds and aromatic compounds.

Another object of this invention is to form a bonding composition by vulcanizing a mixture comprising a copolymer of butadiene and styrene and a material formed by interacting isoprene and a thiophenol in the presence of an acid catalyst.

One embodiment of this invention relates to a bonding composition comprising sulfur, an unsaturated elastomer selected from the group consisting of natural rubber and a rubbery copolymer, and a condensation product of a thiophenol with a conjugated diolefin hydrocarbon.

Another embodiment of this invention relates to a bonding composition comprising sulfur, an unsaturated elastomer selected from the group consisting of natural rubber and a rubbery copolymer, and an alkenylarylthioether condensation product of a thiophenol with a conjugated diolefin hydrocarbon.

A further embodiment of this invention relates to a bonding composition comprising sulfur, a rubbery copolymer of butadiene and styrene, and a condensation product of from about 0.25 to about 5 molecular proportions of a thiophenol with one molecular proportion of a conjugated diolefin hydrocarbon selected from the group consisting of butadiene and isoprene.

A bonding composition suitable for joining concrete, stone, wood, metal, etc., with glass, tile, thermosetting resins, plastics, etc., comprises a vulcanizable material made by reacting a polyenic material such as a dienic or polyenic hydrocarbon or derivative thereof, such as butadiene, isoprene, chloroprene, piperylene, cyclopentadiene, etc., and a substituted aromatic compound selected from thiophenol, thiocresols, and other simple derivatives of thiophenol itself. These reaction products include such materials as alkenylthiophenols, alkenylarylthioethers, di-alkenylated thiophenols, heterocyclic compounds such as thiachromans and thiacoumarans, resinous alkenylated thiophenol condensation products, alkenylthiocresols, alkenylcresylthioethers, di-alkenylated thiocresols, resinous alkenylated thiocresol condensation products, etc.

The reaction products include also the condensation products of the materials with aldehydes or ketones, for example with formaldehyde; the products produced by the polymerization of the materials; and the high molecular weight polymeric and condensation products formed as a resinous bottoms by-product in the preparation of the materials.

The preparation of successful bonding agents applicable to the bonding of the materials of widely dissimilar characteristics discussed above, involves consideration of the following principles: (1) the bonding agent should be capable of setting at a relatively low temperature, so as not to destroy materials which, like wood, are relatively heat unstable; (2) the agent should contain ingredients capable of establishing firm bonds with polar materials such as wood or glass; (3) it should contain ingredients capable of establishing firm bonds with metals; (4) ingredient (2) should be the same as that of ingredient (3) or be capable of forming a stable compound with it.

Alkenylphenylthioethers and other related condensation products of a thiophenol and a conjugated diolefin which may be used as a starting material in this process may be obtained by reacting one molecular proportion of a conjugated diolefin with from about 0.25 to about 5 molecular proportions of a thiophenol in the presence of an acid catalyst at condensation conditions. Suitable acid catalysts include a phosphoric acid, a composite of a phosphoric acid and an ether, a composite of a phosphoric acid and a siliceous adsorbent precalcined at a temperature of from about 250° to about 600°, an acid-acting metal phosphate, and the like. The phosphoric acid containing catalysts are employed at a temperature of from about 25° to about 300° C. and at a pressure of from about substantially atmospheric to about 150 atmospheres or more.

Condensation of a conjugated diolefin with a thiophenol may be carried out by mixing a diolefinic hydrocarbon with an excess of the thiophenol and then passing the resultant mixture or solution in the presence or absence of a non-polar diluent, such as a paraffinic hydrocarbon or naphthenic hydrocarbon, through a suitable tower or reactor containing formed particles of a solid phosphoric acid catalyst or acid phosphate catalyst maintained at a temperature of from about 25 to about 300° C., and preferably at a temperature of from about 75 to about 250° C. The reaction is also carried out at a pressure of substantially atmospheric to about 150 atmospheres or more, the pressure generally being sufficient to maintain a substantial proportion of the reactants in liquid phase.

The step of condensing a thiophenol with a diolefin may also be carried out in a batch type operation by adding the diolefin continuously to a stirred mixture of the thiophenol and a liquid catalyst such as orthophosphoric acid, or a complex of a concentrated phosphoric acid and an ether, such as a complex of 100% orthophosphoric acid and substantially anhydrous diethyl ether.

The products so formed by reacting a conjugated diolefin and a thiophenol in the presence of a phosphoric acid catalyst are separated into a catalyst layer and an organic product layer, the latter being separated into the unreacted thiophenol and reaction products. The reaction products may be fractionally distilled to separate lower boiling products from higher boiling residue or they may be subjected to extraction with aqueous or alcoholic caustic soda solution in order to dissolve thiophenolic materials in the caustic soda solution and thereby separate thiophenolic reaction products from certain substantially neutral condensation products such as thioethers, heterocyclic products, resins, etc. The condensation product which is soluble in caustic soda solution is then recovered as an oily layer by neutralizing the caustic soda solution with an acid or by reacting the caustic soda solution with carbon dioxide so as to liberate dissolved thiophenols such as the alkenylthiophenols together with some unconverted thiophenolic starting materials. The mixture of the thiophenol and alkenylthiophenols so obtained is then subjected to fractional distillation in order to separate unconverted starting materials, monoalkenylthiophenols such as butenylthiophenols or pentenylthiophenols, and higher boiling condensation products. Similarly, the alkali-insoluble material may be fractionated to separate the monoalkenylated product (mainly alkenylarylthioethers), the dialkenylated products, and higher-boiling residues. Alternatively, the mixed alkenylation products, or fractions thereof, may be used without prior separation of caustic-soluble from caustic-insoluble components.

In the case of bonding compositions formed by vulcanizing composites of butenyl or pentenylthiophenols or the isomeric thioethers, or the residues formed in the preparation of butenyl or pentenylthiophenols by the alkenylation of thiophenol with butadiene or isoprene in the presence of phosphoric acid, the presence of residual unsaturation permits vulcanization of the material with sulfur at temperatures of from about 125 to about 200° C. This vulcanization treatment is carried out for a time of from about 0.5 to about 10 hours. The thiophenol groups are capable of firm attachment to polar materials, for example, by hydrogen bonding with the oxygen of the hydroxy groups of cellulosic materials or with the oxygen in glass. The unsaturated linkages are capable of forming firm bonds with metals probably by way of the sulfur used in vulcanization. Finally, if the butenylthiophenol derivative or other alkenylthiophenol derivative is used alone, or if it is used in conjunction with some other vulcanizable material, for example rubber, which bonds two metals via sulfur, the butenylthiophenol compounds or other alkenylthiophenol compounds are capable of linking with the rubber by copolymerization, by covulcanization, or by the formation of thiachroman or thiacourmaran rings.

The thiophenol-conjugated diene reaction products, or their aldehyde condensation products, with sulfur and the conventionally used accelerators or other additives such as carbon black, zinc oxide and the like, may be used with or without vulcanizable elastomeric materials containing double bonds, such as natural or synthetic rubber, for example, butadiene-styrene copolymers, to form a heat curable all-purpose bonding agent. Since in the milling of these materials with rubber, the material may stick to the rolls it may be desirable also to incorporate additional plasticizers or solvents in such compositions. If natural or synthetic rubber comprises part of the bonding composition, the diene-thiophenol condensation product may be used in an amount comprising from about 5 to about 50% of the bonding composition, although generally from about 10% to about 25% is most satisfactory.

The following example is given to illustrate the type of bonding composition referred to above, although the data presented are not included with the intention of restricting unduly the generally broad scope of this invention.

At atmospheric pressure, over a three-hour period 123.7 grams of isoprene was dropped into a stirred mixture of 570 grams of thiophenol and 91.2 grams of 100% orthophosphoric acid. During this three-hour period the temperature of the mixture was maintained at 85-90° C. At the completion of the addition period, the stirring was maintained for an additional one-half hour at 85-90° C., after which time the reaction mixture was allowed to cool. The isoprene was completely absorbed. Upon elimination of the phosphoric acid, the resultant product was subjected to fractional vacuum distillation to give the following results:

|  | Boiling Pt., ° C. | Grams | Percent |
| --- | --- | --- | --- |
| Unreacted thiophenol | 70/21 mm | 298 | 43 |
| Mixture of unreacted thiophenol and monoalkenylation product | 75-125/21 mm | 6.2 | 1 |
| Monopentenylthiophenol fraction | 123-129/14 mm | 193.7 | 28 |
| Mixture of pentenylthiophenol and dipentenylthiophenol | 76-80/½ mm | 20 | 3 |
| Dipentenylthiophenol fraction | 160-170/½ mm | 75.3 | 11 |
| Resinous bottoms | Over 170/½ mm | ≅10 | 1.5 |
| Unaccounted for loss |  | ≅89.8 |  |

The monopentenylated thiophenol fraction was colorless and had a refractive index: $n_d^{20}=1.5636-1.5670$. The dipentenylated thiophenol fraction had a pale yellow color and had a refractive index: $n_d^{20}=1.6119-1.6172$. The residue was a dark brown mass.

The monopentenylthiophenol fraction was washed with 10% sodium hydroxide solution and then with methanolic potassium hydroxide (Claisen's reagent). The pentenylthiophenol is caustic soluble and was sprung from the caustic solution with acid. Only about 2% of the fraction proved caustic soluble; the bulk appeared to be pentenylphenylthioether, having a bromine number corresponding closely to that of a monoolefin.

100 parts by weight of a rubbery butadiene-styrene copolymer (GR-S), 50 parts by weight of carbon black (Kosmobile-77), 20 parts by weight of the pentenyl-phenylthioether (caustic insoluble fraction), 5 parts by weight of zinc oxide, 5 parts by weight of sulfur, and 1.5 parts by weight of 2-mercaptobenzothioazole, are mixed on a rubber mill to form a homogeneous rubber-like mass.

The material mixed on the rubber mill is then vulcanized between two overlapping pieces of soft steel (0.8 mm. thick) at a temperature of 140° C. and under a pressure of 1,000 p.s.i. for 50 minutes. The vulcanized material forms a firm bond with the steel, thus firmly cementing together the two steel strips in this test.

The dipentenylthiophenol caustic soluble fraction is employed in the following formulation which is milled as described above:

|  | Parts |
| --- | --- |
| GR-S | 100 |
| Kosmobile-77 | 50 |
| Dipentenylthiophenol fraction | 20 |
| Sulfur | 4 |
| Zinc oxide | 5 |
| 2-mercaptobenzothiazole | 1.5 |

The milled composite forms an excellent bond between sheet aluminum and steel plate when a sandwich of the bonding agent is vulcanized between the two metals for one hour at 140° C. and 750 p.s.i. pressure.

I claim as my invention:

1. A bonding composition comprising sulfur, an unsaturated elastomer selected from the group consisting of natural rubber and a rubbery copolymer and a condensation product of a thiophenol with a conjugated diolefin hydrocarbon.

2. A bonding composition comprising sulfur, an unsaturated elastomer selected from the group consisting of natural rubber and a rubbery copolymer, and an alkenylphenylthioether condensation product of a thiophenol with a conjugated diolefin hydrocarbon.

3. A bonding composition comprising sulfur, an unsaturated elastomer selected from the group consisting of natural rubber and a rubbery copolymer, and a resinous condensation product of a thiophenol with a conjugated diolefin hydrocarbon.

4. A bonding composition comprising sulfur, an unsaturated elastomer selected from the group consisting of natural rubber and a rubbery copolymer, and a condensation product of from about 0.25 to about 5 molecular proportions of a thiophenol with one molecular proportion of a conjugated diolefin hydrocarbon.

5. A bonding composition comprising sulfur, an unsaturated elastomer selected from the group consisting of natural rubber and a rubbery copolymer, and an alkenylphenylthioether condensation product of from about 0.25 to about 5 molecular proportions of a thiophenol with one molecular proportion of a conjugated diolefin hydrocarbon.

6. A bonding composition comprising sulfur, an unsaturated elastomer selected from the group consisting of natural rubber and a rubbery copolymer, and a resinous condensation product of from about 0.25 to about 5 molecular proportions of a thiophenol with 1 molecular proportion of a conjugated diolefin hydrocarbon.

7. A bonding composition comprising a rubber, sulfur and an acid-catalyzed reaction product of a thiophenol with a conjugated diolefin hydrocarbon.

References Cited in the file of this patent

UNITED STATES PATENTS

| | | |
|---|---|---|
| 2,316,949 | Garvey | Apr. 20, 1943 |
| 2,325,981 | Sarbach | Aug. 3, 1943 |
| 2,337,464 | Hecht | Dec. 21, 1943 |
| 2,443,811 | Winkler | June 22, 1948 |
| 2,476,824 | Albert | July 19, 1949 |
| 2,662,869 | Bloch | Dec. 15, 1953 |